(12) United States Patent
Kim et al.

(10) Patent No.: US 12,362,371 B2
(45) Date of Patent: Jul. 15, 2025

(54) APPARATUS AND METHOD FOR ESTIMATING AN AMOUNT OF CONDENSED WATER IN AN ANODE OF A FUEL CELL SYSTEM AND METHOD OF CONTROLLING A DRAIN VALVE USING SAME

(71) Applicants: HYUNDAI MOTOR COMPANY, Seoul (KR); KIA CORPORATION, Seoul (KR)

(72) Inventors: Mi Sun Kim, Yongin-si (KR); Soon Woo Kwon, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 403 days.

(21) Appl. No.: 17/876,478

(22) Filed: Jul. 28, 2022

(65) Prior Publication Data

US 2023/0074636 A1    Mar. 9, 2023

(30) Foreign Application Priority Data

Sep. 8, 2021  (KR) .......................... 10-2021-0119569

(51) Int. Cl.
*H01M 8/04492*  (2016.01)
*G01F 22/00*  (2006.01)
(Continued)

(52) U.S. Cl.
CPC ........ *H01M 8/04492* (2013.01); *G01F 22/00* (2013.01); *G05D 9/12* (2013.01);
(Continued)

(58) Field of Classification Search
None
See application file for complete search history.

(56) References Cited

U.S. PATENT DOCUMENTS 10,818,942 B2    10/2020  Kwon et al.
2014/0093796 A1*  4/2014  Aoki ................. H01M 8/04358
                                                        429/413
(Continued)

FOREIGN PATENT DOCUMENTS

KR    20130037694 A  *  4/2013
KR    20190108304 A     9/2019
KR    20200042278 A     4/2020

*Primary Examiner* — David Earl Ogg
(74) *Attorney, Agent, or Firm* — Lempia Summerfield Katz LLC

(57) ABSTRACT

An apparatus for estimating an amount of condensed water in an anode of a fuel cell system includes: an initial anode water vapor amount calculation unit to calculate an initial amount of water vapor in the anode of a fuel cell upon startup, an anode diffusion amount calculation unit to calculate an amount of $H_2O$ diffused from a cathode to the anode, a purge amount calculation unit to calculate an amount of water vapor discharged upon gas purging in the anode, a recirculation amount calculation unit to calculate the amount of water vapor recirculated to the anode, and a condensed water amount determination and water level estimation unit to calculate the actual amount of water vapor in the anode based on values calculated using these units and to calculate the amount of condensed water in a water trap.

20 Claims, 4 Drawing Sheets

(51) Int. Cl.
   *G05D 9/12*      (2006.01)
   *H01M 8/04111*   (2016.01)
   *H01M 8/04119*   (2016.01)
   *H01M 8/04223*   (2016.01)
   *H01M 8/04302*   (2016.01)
   *H01M 8/04828*   (2016.01)

(52) U.S. Cl.
   CPC .... *H01M 8/04111* (2013.01); *H01M 8/04179* (2013.01); *H01M 8/04231* (2013.01); *H01M 8/04302* (2016.02); *H01M 8/04828* (2013.01)

(56) References Cited

U.S. PATENT DOCUMENTS

| | | | |
|---|---|---|---|
| 2015/0280260 A1* | 10/2015 | Lee | H01M 8/04164 429/414 |
| 2017/0346112 A1* | 11/2017 | Shim | H01M 8/04492 |
| 2019/0288310 A1* | 9/2019 | Kwon | H01M 8/04432 |

* cited by examiner

FIG. 1 "PRIOR ART"

APPARATUS AND METHOD FOR ESTIMATING AN AMOUNT OF CONDENSED WATER IN AN ANODE OF A FUEL CELL SYSTEM AND METHOD OF CONTROLLING A DRAIN VALVE USING SAME

CROSS-REFERENCE TO THE RELATED APPLICATION

This application claims priority to and the benefit of Korean Patent Application No. 10-2021-0119569, filed on Sep. 8, 2021, in the Korean Intellectual Property Office, the disclosure of which is incorporated herein by reference in its entirety.

BACKGROUND

1. Field

The present disclosure relates to a method of estimating the amount of condensed water in the anode of a fuel cell system and a method of controlling a drain valve based on the estimated amount of condensed water. More particularly, the present disclosure relates to an apparatus and method for estimating the amount of condensed water in the anode of a fuel cell system capable of preventing malfunction of draining by accurately calculating the amount of condensed water collected in a water trap and to a method of controlling a drain valve using the same.

2. Description of the Related Art

The statements in this section merely provide background information related to the present disclosure and may not constitute prior art.

A fuel cell is a kind of power generator that directly converts chemical energy generated by oxidation of fuel into electrical energy. A fuel cell is basically the same as a chemical cell in that it uses oxidation and reduction reactions, but is different in that a reactant is continuously supplied from the outside and a reaction product is continuously removed from the system, unlike the chemical cell, in which the cell reaction is carried out inside a closed system. Since the reaction product of the fuel cell is pure water, thorough research into the use thereof as an energy source for an eco-friendly vehicle is ongoing.

The fuel cell system includes a fuel cell stack that generates electrical energy through a chemical reaction, an air supply system that supplies air to the cathode of the fuel cell stack, and a hydrogen supply system that supplies hydrogen to the anode of the fuel cell stack.

When power is generated in the fuel cell stack, product water is generated inside the fuel cell stack, and a portion thereof passes through the electrolyte membrane due to the concentration difference and is discharged to the anode. In the hydrogen supply system, hydrogen gas is recirculated using a recirculator, and the product water discharged from the anode is condensed and stored in a water trap included in the hydrogen supply system. The water trap includes a water level sensor, and when the amount of condensed water exceeds a preset water level, the drain valve is opened to discharge the stored condensed water to the outside of the fuel cell stack.

FIG. 1 schematically illustrates the configuration of a system that provides a water trap with a water level sensor to discharge the stored condensed water.

The water level sensor provided to the water trap is configured to directly measure the level of condensed water in the water trap. Here, when the value measured by the water level sensor reaches at a full level ($\beta$ mm), the drain valve is opened to empty the water trap. On the other hand, the water level sensor may be configured to close the drain valve when it is confirmed that the lowest water level ($\alpha$ mm) has been reached.

As illustrated in FIG. 1, in the system that controls opening and closing of the drain valve using the water level sensor, the amount of condensed water in the water trap may be determined based only on the sensor value, so the water level does not match with the actual water level due to a slope or a traveling road or dynamic behavior of a vehicle (i.e. a sudden stop or sudden start). Hence, frequent opening/closing of the valve may occur unintentionally, and stack flooding may occur due to deterioration of discharge performance of condensed water. This may cause deterioration of stack durability and cell drop due to insufficient reactive gas supply.

Moreover, in the system that relies on the water level sensor, even when the amount of condensed water is the minimum level, a drain valve may be excessively opened by erroneous detection due to fluctuation of condensed water, which may cause a problem in which the concentration of exhaust gas increases.

SUMMARY

The present disclosure provides an apparatus and method for estimating the amount of condensed water in the anode of a fuel cell system, in which the actual amount of condensed water in a water trap may be accurately calculated in the fuel cell system configured to collect condensed water in the water trap and to discharge the collected condensed water through a drain valve.

The present disclosure also provides an apparatus and method for estimating the amount of condensed water in the anode of a fuel cell system, in which the actual amount of condensed water collected in a water trap may be accurately estimated, thus preventing malfunction of draining due to a slope of a traveling road or dynamic behavior of a vehicle (i.e. a sudden stop/acceleration or sudden start) during draining, thereby preventing stack flooding and an increase in the concentration of exhaust gas.

In addition, the present disclosure provides an apparatus for estimating the amount of condensed water in the anode of a fuel cell system having a reduced manufacturing cost due to elimination of the water level sensor from the water trap.

In one form of the present disclosure, a method of estimating an amount of condensed water in an anode of a fuel cell system includes: calculating an initial amount of water vapor in an anode of a fuel cell upon startup, calculating an amount of $H_2O$ diffused from a cathode to the anode during power generation by the fuel cell, calculating an amount of water vapor discharged upon gas purging in the anode during power generation by the fuel cell, and calculating an amount of water vapor recirculated to the anode during power generation by the fuel cell. In particular, an actual amount of water vapor in the anode is calculated based on values calculated in respective steps, and an amount of condensed water in a water trap is calculated based on a difference between the calculated actual amount of water vapor in the anode and an amount of saturated water vapor in the anode at a current temperature.

In calculating the initial amount of water vapor in the anode upon startup, the initial amount of water vapor in the anode may be calculated based on an ideal gas equation using a saturated water vapor pressure of the anode at a stack temperature as a current water vapor pressure of the anode.

In calculating the amount of $H_2O$ diffused from the cathode to the anode, a vapor diffusion rate due to a vapor pressure difference between the cathode and the anode may be integrated over time to thereby calculate an amount of diffused water vapor between the cathode and the anode. The calculated amount of diffused water vapor may be determined to be the amount of $H_2O$ diffused from the cathode to the anode.

In calculating the amount of $H_2O$ diffused from the cathode to the anode, a correction factor ($K$, $0 \leq K \leq 1$) for compensating for an amount of $H_2O$ discharged to the outside of a stack among $H_2O$ generated at the cathode may be determined, and a corrected amount of diffused water vapor, obtained by multiplying the calculated amount of diffused water vapor by the correction factor, may be determined to be the amount of $H_2O$ diffused from the cathode to the anode.

In one form, the correction factor may be a value selected using a predetermined map depending on a degree of opening of an air pressure control valve connected to an air outlet and a rotation speed of an air compressor.

In calculating the amount of water vapor discharged upon purging, the amount of water vapor discharged upon purging may be calculated by multiplying a total gas purge rate by a molar fraction of water vapor to obtain a water vapor purge rate and integrating the water vapor purge rate over time.

In calculating the amount of water vapor recirculated to the anode, the amount of water vapor recirculated to the anode may be calculated by multiplying a total amount of recirculated gas, determined depending on a hydrogen supply pressure and a stack current, by a partial pressure of water vapor in a gas in the anode.

A water trap water level (%) may be additionally calculated based on a volume ratio of the calculated amount of condensed water in the water trap and an internal volume of the water trap. For the volume ratio calculation, the calculated amount of condensed water in the water trap is covered into a volume.

In addition, the present disclosure provides a method of controlling a drain valve using the method of estimating the amount of condensed water in the anode of a fuel cell system, further including determining a water trap water level (%) based on a volume ratio of the calculated amount of condensed water in the water trap and an internal volume of the water trap. Thus, when a water level determined in the water trap exceeds a reference water level value, the drain valve is opened to discharge condensed water, and when an accumulated purge amount exceeds a reference purge amount, the drain valve is closed.

In another form of the present disclosure, an apparatus for estimating an amount of condensed water in an anode of a fuel cell system includes: an initial anode water vapor amount calculation unit configured to calculate an initial amount of water vapor in an anode of a fuel cell upon startup, an anode diffusion amount calculation unit configured to calculate an amount of $H_2O$ diffused from a cathode to the anode during power generation by the fuel cell, a purge amount calculation unit configured to calculate an amount of water vapor discharged upon gas purging in the anode during power generation by the fuel cell, a recirculation amount calculation unit configured to calculate an amount of water vapor recirculated to the anode during power generation by the fuel cell, and a condensed water amount determination and water level estimation unit configured to calculate an actual amount of water vapor in the anode based on values calculated using the initial anode water vapor amount calculation unit, the anode diffusion amount calculation unit, the purge amount calculation unit, and the recirculation amount calculation unit and to calculate an amount of condensed water in a water trap based on a difference between the calculated actual amount of water vapor in the anode and an amount of saturated water vapor in the anode at a current temperature.

The initial anode water vapor amount calculation unit may be configured such that the initial amount of water vapor in the anode is calculated based on an ideal gas equation using a saturated water vapor pressure of the anode at a stack temperature as a current water vapor pressure of the anode, the anode diffusion amount calculation unit may be configured such that an amount of diffused water vapor between the cathode and the anode is calculated by integrating a vapor diffusion rate due to a vapor pressure difference between the cathode and the anode over time, the purge amount calculation unit may be configured such that the amount of water vapor discharged upon purging is calculated by multiplying a total gas purge rate by a molar fraction of water vapor to obtain a water vapor purge rate and integrating the water vapor purge rate over time, and the recirculation amount calculation unit may be configured such that the amount of water vapor recirculated to the anode is calculated by multiplying a total amount of recirculated gas, determined depending on a hydrogen supply pressure and a stack current, by a partial pressure of water vapor in a gas in the anode.

The anode diffusion amount calculation unit may be configured such that a correction factor ($K$, $0 \leq K \leq 1$) for compensating for an amount of $H_2O$ discharged to the outside of a stack among $H_2O$ generated at the cathode is determined and a corrected amount of diffused water vapor, obtained by multiplying the calculated amount of diffused water vapor by the correction factor, is determined to be the amount of $H_2O$ diffused from the cathode to the anode, and the correction factor may be a value selected using a predetermined map depending on a degree of opening of an air pressure control valve connected to an air outlet and a rotation speed of an air compressor.

The condensed water amount determination and water level estimation unit may be configured such that a water trap water level (%) is additionally calculated based on a volume ratio of the calculated amount of condensed water in the water trap and an internal volume of the water trap.

In one form, when a water level determined in the water trap using the condensed water amount determination and water level estimation unit exceeds a reference water level value, a drain valve opening command may be transmitted to a controller, and when an accumulated purge amount exceeds a reference purge amount, a drain valve closing command may be transmitted to the controller.

BRIEF DESCRIPTION OF THE DRAWINGS

The above and other objects, features and other advantages of the present disclosure should be more clearly understood from the following detailed description taken in conjunction with the accompanying drawings, in which.

Figure 1:
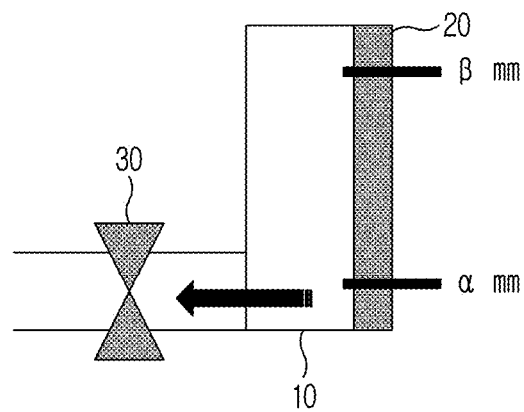
FIG. 1 illustrates the configuration of a conventional system including a water trap provided with a water level sensor and a drain valve that discharges condensed water.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

When a component, device, element, or the like of the present disclosure is described as having a purpose or performing an operation, function, or the like, the component, device, or element should be considered herein as being "configured to" meet that purpose or to perform that operation or function.

As publicly known in the art, some of exemplary forms may be illustrated in the accompanying drawings from the viewpoint of function blocks, units and/or modules. Those having ordinary skill in the art should understand that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in the present disclosure.

Reference is now be made in detail to an apparatus and method for correcting a pressure sensor offset of a fuel cell system according to various embodiments of the present disclosure, examples of which are illustrated in the accompanying drawings.

Figure 2:
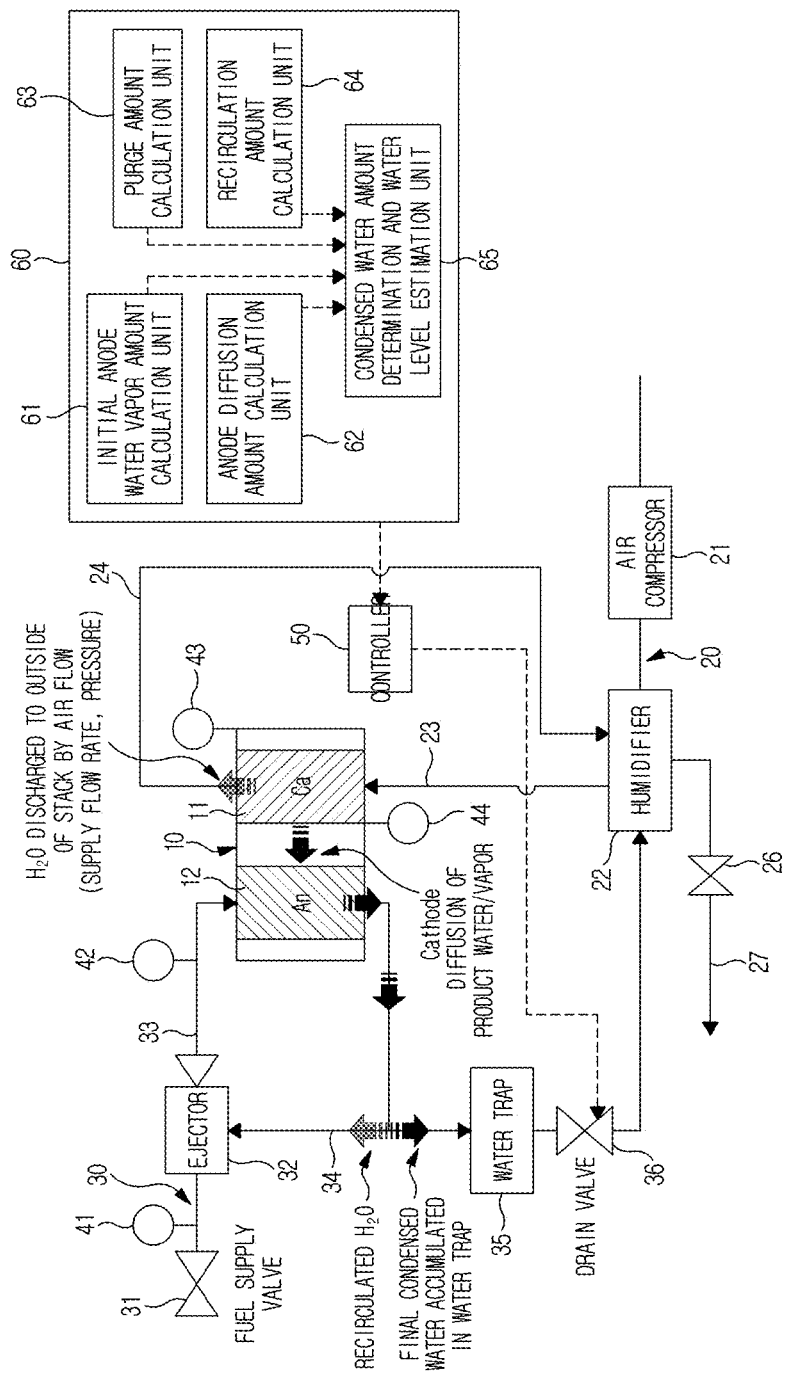
FIG. 2 illustrates the configuration of a fuel cell system including an apparatus for estimating the amount of condensed water in an anode according to an embodiment of the present disclosure.

FIG. 2 illustrates the configuration of a fuel cell system including an apparatus for estimating the amount of condensed water in an anode according to an embodiment of the present disclosure.

With reference to FIG. 2, an air supply system 20 configured to supply air is connected to the cathode of a fuel cell stack 10, and a hydrogen supply system 30 configured to supply hydrogen is connected to the anode thereof.

The air supply system 20 may include an air compressor 21 configured such that outdoor air is sucked, compressed, and transferred to a humidifier, and a humidifier 22 configured such that the compressed air is humidified to thereby be imparted with appropriate humidity. The air having passed through the humidifier 22 reacts with hydrogen at an anode 12 while passing through a cathode 11 via an air supply line 23. As the humidifier 22, a membrane humidifier, performing water exchange between the water in wet gas discharged after fuel cell reaction and the air supplied from the outside, may be mainly used. To this end, the air discharged from the cathode outlet may be supplied again to the humidifier 22 through an air return line 24. Moreover, an air pressure control valve 26 is provided at one side of the humidifier 22, and the wet air not participating in humidification is discharged to the outside along an air exhaust line 27 via the air pressure control valve 26. The air pressure control valve 26 may serve to control the pressure of air supplied to the cathode by adjusting the rotation speed of the air compressor 21 or by adjusting the degree of opening of the valve independently thereof.

In the hydrogen supply system 30, hydrogen supplied through a hydrogen supply valve 31 is supplied to the anode 12 through an ejector 32 and a hydrogen supply line 33. Pressure sensors 41, 42 configured to detect pressure may be disposed upstream and downstream of the ejector 32.

Meanwhile, some hydrogen not participating in the reaction, among the hydrogen supplied to the anode, may be recirculated upstream of the anode through a hydrogen recirculation line 34 and supplied again to the anode. Here, condensed water in the anode is discharged together with the hydrogen not participating in the reaction, and a water trap 35 configured to collect this condensed water is provided at the anode outlet side.

A drain valve 36 is provided downstream of the water trap 35, and condensed water may be discharged to the outside through the drain valve 36. As such, condensed water discharged through the drain valve 36 may be discharged to the outside along the air exhaust line 27, and may be transferred to the humidifier 22 of the air supply system and used for humidification, as illustrated in FIG. 1.

A controller 50 controls the operation of the fuel cell system based on information obtained using various sensors 41, 42, 43, 44 in the fuel cell system, and generally controls operable components in the fuel cell system, such as the air compressor 21 and various valves 25, 26, 31, 36.

In addition, the fuel cell system illustrated in FIG. 2 includes an apparatus 60 for estimating the amount of condensed water in the anode.

This apparatus 60 for estimating the amount of condensed water in the anode is configured such that the actual amount of water vapor in the anode is calculated based on various pieces of data in the fuel cell system and the amount of condensed water expected to be condensed due to oversaturation of water vapor in the anode is estimated based thereon. In one embodiment of the present disclosure, as illustrated in FIG. 2, the apparatus 60 for estimating the amount of condensed water in the anode includes an initial anode water vapor amount calculation unit 61, an anode diffusion amount calculation unit 62, a purge amount calculation unit 63, a recirculation amount calculation unit 64, and a condensed water amount determination and water level estimation unit 65.

In particular, the apparatus for estimating the amount of condensed water in the anode is configured such that the initial amount of water vapor in the anode upon startup is estimated and then the amount of water vapor expected to be condensed due to oversaturation is calculated as the amount of condensed water collected in the water trap, in consideration of the change in the amount of water vapor in the anode during power generation.

Hereinafter, a process of calculating the amount of water vapor using individual units in the apparatus for estimating the amount of condensed water in the anode and a process of estimating the amount of condensed water in the water trap based on the calculated amount of water vapor are described in detail.

Specifically, the initial anode water vapor amount calculation unit 61 may be configured to calculate the initial amount of water vapor in the anode of a fuel cell upon startup. Since the initial anode is in equilibrium with the system temperature, it may be assumed that it is saturated at a relative humidity of 100% based on a stack coolant temperature. Moreover, the initial amount of water vapor in the anode may be determined based on the ideal gas equation using the volume of the anode ($V_{an}$), the stack coolant temperature (T), corresponding to the stack temperature, and the water vapor pressure of the anode ($P_{an,\,v}$). Briefly, the initial number of moles of water vapor in the anode ($n_{an}$) may be calculated using Equation 1 below.

$$n_{on} = \frac{P_{an,v} \times V_{an}}{RT} \qquad \text{[Equation 1]}$$

($n_{an}$ is the initial number of moles of water vapor in the anode, $P_{an,\,v}$ is the water vapor pressure of the anode, $V_{an}$ is the volume of the anode, T is the stack coolant temperature, and R is the gas constant, that is, 8.314 [j/mol·K].)

Assuming saturation at a relative humidity of 100%, the water vapor pressure of the anode ($P_{anH2O}$) is the same as the saturated water vapor pressure of the anode, so the initial number of moles of water vapor in the anode ($n_{an}$) in Equation 1 may be calculated based on the saturated water vapor pressure of the anode, the stack coolant temperature (stack temperature), and the volume of the anode. Therefore, the initial anode water vapor amount calculation unit 61 may calculate the initial amount of water vapor in the anode based on the ideal gas equation using the saturated water vapor pressure of the anode at the stack temperature as the current water vapor pressure of the anode.

In addition, the anode diffusion amount calculation unit 62 may be configured to calculate the amount of $H_2O$ diffused from the cathode to the anode during power generation by the fuel cell. In particular, the anode diffusion amount calculation unit 62 may be configured such that the water vapor diffusion rate due to the difference in water vapor pressure between the cathode and the anode is integrated over time to thereby calculate the amount of water vapor diffused between the cathode and the anode, and the calculated amount of diffused water vapor may be determined to be the amount of $H_2O$ diffused from the cathode to the anode.

Specifically, the diffusion of $H_2O$ generated at the cathode to the anode is caused by the differential pressure between the water vapor pressure of the cathode and the water vapor pressure of the anode. Since the relative humidity (RH) is "current water vapor amount/saturated water vapor amount*100", the water vapor pressure of the cathode ($P_{ca,V}$) may be obtained from a relative humidity estimate calculated using a known cathode relative humidity estimator.

Accordingly, the water vapor pressure of the cathode ($P_{ca,V}$) may be calculated using Equation 2 below.

$$P_{ca,v} = P_{caH2Osat} \lambda RH \text{ estimate} \qquad \text{[Equation 2]}$$

($P_{ca,V}$ is the water vapor pressure of the cathode, $P_{caH2Osat}$ is the saturated water vapor pressure of the cathode, and RH estimate is the value calculated using a cathode relative humidity estimator (the actual relative humidity value of the cathode).)

With regard to Equation 2, the saturated water vapor pressure of the cathode is a function of the stack coolant temperature (corresponding to the stack temperature), and may be obtained using the saturated water vapor pressure calculation equation.

The number of moles of water vapor diffused between the cathode and the anode may be determined by calculating a water vapor diffusion rate between the cathode and the anode using Equation 3 below and integrating the water vapor diffusion rate over time.

$$Ca\text{-An water vapor diffusion rate } (n'_{vxo}) = \qquad \text{[Equation 3]}$$
$$\frac{D_v}{RT} \frac{P_{ca,v} - p_{an,v}}{\delta} A \times K$$

($n'_{v\,xo}$ is the cathode-anode water vapor diffusion rate, $D_v$ is the water vapor diffusion coefficient, K is the correction factor, A is the catalyst area, and $\delta$ is the diffusion distance.)

In calculating the Ca—An vapor diffusion rate, diffusion is assumed to occur due to the differential pressure, but some of $H_2O$ generated at the cathode has no choice but to be discharged to the outside of the stack through the air outlet, so some $H_2O$ is not diffused but is discharged to the outside of the stack. Accordingly, it is desired to compensate for the amount of $H_2O$ that is discharged to the outside of the stack, and in the present disclosure, the correction factor (K, $0 \leq K \leq 1$) is applied.

Because the amount of $H_2O$ discharged to the outside of the stack varies depending on the supplied air flow rate and the applied pressure, the correction factor K may be a value selected using a predetermined map depending on the rotation speed of the air compressor (or a flow rate of air by the air compressor) and the degree of opening of the air pressure control valve connected to the air outlet to control the air pressure.

In addition, the purge amount calculation unit 63 may be configured to calculate the amount of water vapor discharged upon gas purging in the anode during power generation by the fuel cell. The purge amount calculation unit 63 may be configured such that the amount of water vapor discharged upon purging is calculated by multiplying a total gas purge rate by a molar fraction of water vapor to obtain a water vapor purge rate and integrating the water vapor purge rate over time.

Specifically, the number of moles of water vapor discharged upon purging ($n_{v\,purge}$) may be determined by calculating a water vapor purge rate using Equation 4 below and integrating the water vapor purge rate over time.

$$\text{Water vapor purge rate } (n'_{vpurge}) = n'_{purge} \times \frac{n_v}{n_{an}} \qquad \text{[Equation 4]}$$

($n'_{v\,purge}$ is the water vapor purge rate, $n'_{purge}$ is the gas purge rate, and $n_v/n_{an}$ is the molar fraction of water vapor.)

In addition, the recirculation amount calculation unit 64 may be configured to calculate the amount of water vapor recirculated to the anode during power generation by the fuel cell. In particular, the recirculation amount calculation unit 64 may calculate the amount of water vapor that is recirculated to the anode by multiplying the total amount of recirculated gas, determined depending on the hydrogen supply pressure and the stack current, by the partial pressure of water vapor in gas in the anode.

In this regard, map data on the total amount of recirculated gas mapped to the ejector design specification criteria, the supply pressure (the value of the nozzle pressure sensor 41 or the stack inlet hydrogen pressure sensor 42), and the stack current may be utilized. Therefore, the total amount (number of moles) of recirculated gas may be determined based on map data of the total amount (number of moles) of recirculated gas depending on the stack current and the supplied hydrogen pressure, and the determined total amount of recirculated gas may be multiplied by the partial pressure value of water vapor in the mixed gas in the anode, thereby calculating the final amount of recirculated water vapor (Equation 5 below).

$$\text{Number of moles of recirculated water vapor}(n_{vrec}) = n_{rec} \times \frac{n_v}{n_{an}} \quad [\text{Equation 5}]$$

($n_{v\ rec}$ is the number of moles of recirculated water vapor, $n_{rec}$ is the total amount of recirculated gas, and $n_v/n_{an}$ is the molar fraction of water vapor.)

Based on the number of moles of water vapor calculated using the individual units described above, the condensed water amount determination and water level estimation unit 65 may be configured to calculate the actual amount of water vapor in the anode and to calculate the amount of condensed water in the water trap based on the difference between the actual amount of water vapor in the anode thus calculated and the amount of saturated water vapor in the anode at the current temperature.

Specifically, the number of moles of water vapor calculated using the initial anode water vapor amount calculation unit 61 is referred to as "①", the number of moles of water vapor calculated using the anode diffusion amount calculation unit 62 is referred to as "②", the amount of purged water vapor calculated using the purge amount calculation unit 63 is referred to as "③", and the amount of recirculated water vapor calculated using the recirculation amount calculation unit 64 is referred to as "④".

In the calculation of the current actual amount of water vapor in the anode using ① to ④ as described above, the amount of purged water vapor and the amount of recirculated water vapor are the values to be subtracted, whereas the initial amount of water vapor in the anode "①" and the amount of water vapor diffused from the cathode to the anode "②" are the values to be added.

Therefore, the current actual amount of water vapor in the anode may be determined to be "①+②−③−④". Moreover, the current amount of water vapor expected to be condensed due to oversaturation in the anode, that is, the amount of condensed water collected in the anode water trap, may be the value obtained by subtracting the "amount of saturated water vapor in the anode" from the current actual amount of water vapor in the anode "①+②−③−④". In this regard, since the value calculated based on ① to ④ as described above is the number of moles of water vapor, the mass of condensed water may be calculated by multiplying the values of ① to ④ by the molar mass of water. For reference, if the 'current amount of water vapor expected to be condensed due to oversaturation in the anode' is a negative value, it is processed as '0'.

Accordingly, the amount of condensed water in the water trap may be determined as described above using the condensed water amount determination and water level estimation unit 65.

Moreover, the condensed water amount determination and water level estimation unit 65 may be configured such that the water trap water level (%) is additionally calculated based on a volume ratio of the calculated amount of condensed water in the water trap and an internal volume of the water trap. For the volume ratio calculation, the calculated amount of condensed water in the water trap may be converted into a volume thereof.

Based on the equation "water trap water level (%)=volume of condensed water/volume of water trap×100", the water trap water level may be determined by calculating the ratio of the converted volume of condensed water to the internal volume of the water trap using the condensed water amount determination and water level estimation unit 65.

Meanwhile, opening and closing of a drain valve may be controlled based on the calculated amount of condensed water and the water level estimation results using the apparatus for estimating the amount of condensed water in the anode.

The method of controlling the drain valve may be performed in a manner in which, when the water level exceeds a certain level, the drain valve is opened, whereas when the water level decreases below a reference level, the drain valve is closed, as in the conventional case in which a water level sensor is used.

For example, when the water level determined in the water trap using the condensed water amount determination and water level estimation unit 65 exceeds a reference water level value (B %), a drain valve opening command may be transmitted to the controller, and the controller, having received the drain valve opening command, may directly open the drain valve.

On the other hand, when the condensed water is drained and thus the water level of the water trap reaches the lowest level, the drain valve has to be closed again.

An integrated valve having both purging and draining functions is configured such that condensed water is always discharged first when the drain valve is opened, and after completion of discharge of condensed water, the mixed gas in the anode is discharged to the atmosphere. Therefore, in a system that does not have a valve position sensor or a trap water level sensor, when the accumulated value for the purge amount estimate reaches at least a certain value after the valve opening command, it may be determined that water discharge is completed and the mixed gas in the anode has been discharged (purged). In the present disclosure, the accumulated value for the purge amount estimate may be set as a reference value for closing a valve, and a drain valve closing command may be executed accordingly.

In an embodiment of the present disclosure, the drain valve may be controlled to be closed when the accumulated purge amount exceeds a reference purge amount "A". To this end, the apparatus for estimating the amount of condensed water in the anode may transmit a drain valve closing command to the controller when the accumulated purge amount exceeds the reference purge amount.

Figure 3:
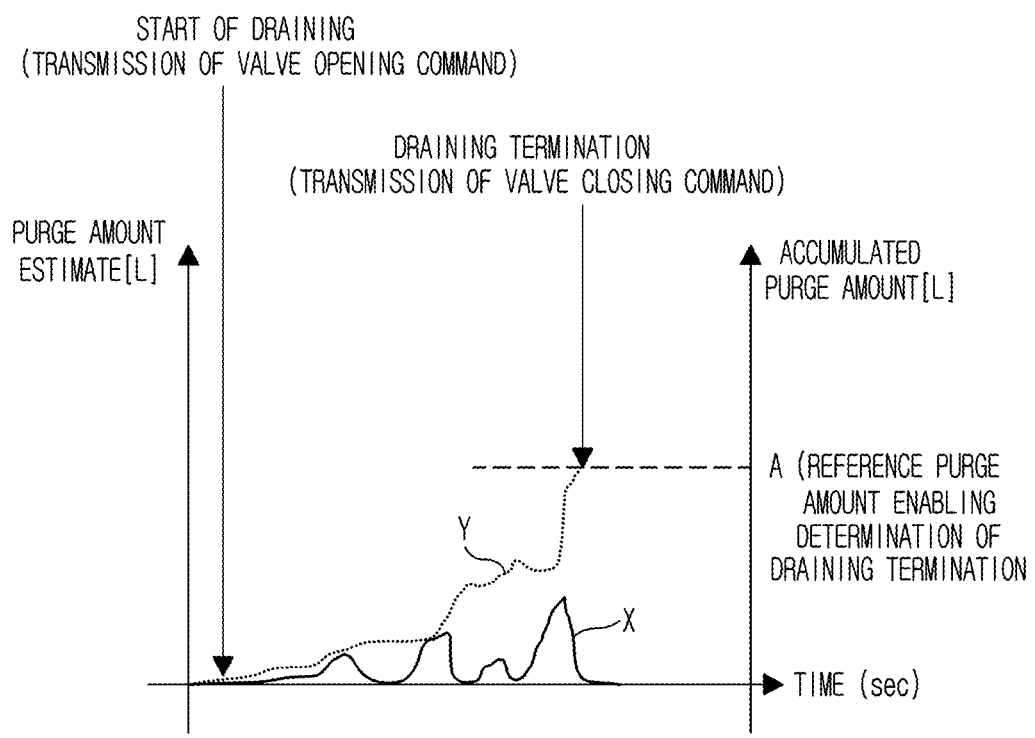
FIG. 3 is a graph illustrating transmission of a draining termination command depending on the cumulative purge amount in a process of controlling a drain valve using a process of estimating the amount of condensed water in the anode of a fuel cell system according to an embodiment of the present disclosure.

With regard thereto, FIG. 3 is a graph illustrating transmission of a draining termination command depending on the cumulative purge amount after start of draining. As illustrated in FIG. 3, after start of draining (opening of the drain valve), draining may be terminated (the drain valve may be closed) at the time point at which the accumulated purge amount exceeds the reference purge amount A.

Figure 4:
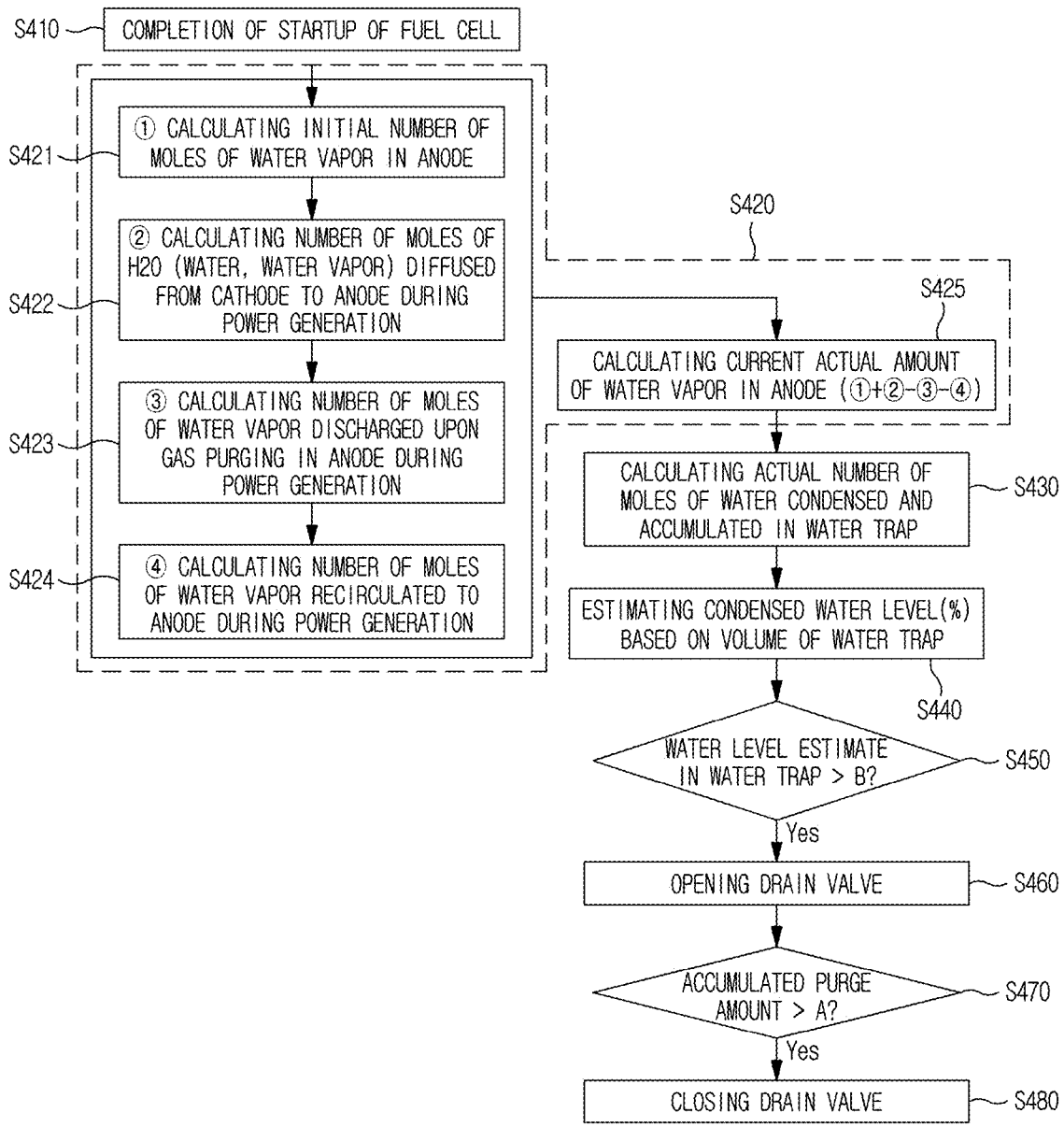
FIG. 4 is a flowchart illustrating the process of estimating the amount of condensed water in the anode of a fuel cell system according to an embodiment of the present disclosure and the process of controlling a drain valve using the same.

FIG. 4 is a flowchart illustrating the process of estimating the amount of condensed water in the anode of a fuel cell system according to an embodiment of the present disclosure and the process of controlling a drain valve using the same.

In particular, as illustrated in FIG. 4, steps S410 to S440 show estimation of the amount of condensed water in the anode and the water level, and steps S450 to S480 generally show a draining control method for controlling opening and closing of the drain valve based on the results of estimation of water level in the water trap. Therefore, although FIG. 4 illustrates both the process of estimating the amount of condensed water in the anode and the water level and the process of controlling the drain valve, the present disclosure is not limited thereto, and it should be clearly stated that the method of estimating the amount of condensed water in the anode up to step S430 and the method of estimating the water level in the water trap up to step S440 may be performed separately.

In particular, since respective calculation processes in steps S421 to S425 are specified in the above description of the apparatus for estimating the amount of condensed water in the anode, a redundant description thereof is omitted. However, those of having ordinary skill in the art should be able to fully understand that in performing steps S421 to S425, the description of the apparatus for estimating the amount of condensed water in the anode may be equally applied.

When briefly describing individual steps, the method of estimating the amount of condensed water in the anode of the fuel cell system according to an embodiment of the present disclosure and the method of controlling the drain valve using the same may include the following steps.

In the state in which power is able to be generated by the fuel cell system after completion of startup of the fuel cell, calculation of the initial amount of water vapor in the anode of the fuel cell upon startup using the initial anode water vapor amount calculation unit 61 (S421), calculation of the amount of $H_2O$ diffused from the cathode to the anode during power generation by the fuel cell using the anode diffusion amount calculation unit 62 (S422), calculation of the amount of water vapor discharged upon gas purging in the anode during power generation by the fuel cell using the purge amount calculation unit 63 (S423), and calculation of the amount of water vapor recirculated to the anode during power generation by the fuel cell using the recirculation amount calculation unit 64 (S424) may be performed.

Moreover, calculation of the actual amount of water vapor in the anode based on the values calculated through steps S421 to S424 as described above (S425) and calculation of the amount of condensed water (number of moles of condensed water) in the water trap (S430) based on the difference between the actual amount of water vapor in the anode calculated through step S420 and the amount of saturated water vapor in the anode at the current temperature may be performed.

Thereafter, a water trap water level (%) is estimated based on a volume ratio of the calculated amount of condensed water in the water trap and an internal volume of the water trap (S440), and when the determined water level in the water trap exceeds a reference water level value (S450), the drain valve is opened, whereby the condensed water is discharged (S460).

After discharge of a sufficient amount of condensed water through the open drain valve, when the accumulated purge amount exceeds a reference purge amount (S470), the drain valve is closed (S480).

Thereby, the amount of condensed water and the water level in the water trap may be accurately estimated without the need to provide a water level sensor to the water trap at the anode side of the fuel cell system, so efficient control of opening and closing of the drain valve becomes possible.

As is apparent from the above description, in the apparatus and method for estimating the amount of condensed water in the anode of a fuel cell system according to the present disclosure, it is possible to eliminate a water level sensor applied to detect the water level in a water trap when conventionally controlling opening/closing of a drain valve, thereby reducing the cost of manufacturing the fuel cell system.

In addition, according to the present disclosure, the actual amount of condensed water collected in the water trap can be accurately estimated, thereby preventing malfunction of draining due to a road slope or dynamic behavior of a vehicle (e.g., a sudden stop or sudden start) during draining.

Thereby, in the method of controlling the drain valve according to the present disclosure, it is possible to fundamentally prevent malfunction of draining on a slope or the like, thus preventing deterioration of stack durability due to stack flooding and cell drop. Moreover, fuel can be prevented from being excessively discharged through the drain valve, thereby preventing an increase in the concentration of exhaust gas.

Although the some embodiments of the present disclosure have been disclosed for illustrative purposes, those having ordinary skill in the art should appreciate that various modifications, additions and substitutions are possible, without departing from the scope and spirit of the present disclosure.

What is claimed is:

1. A method of estimating an amount of condensed water in a fuel cell system, the method comprising:
   calculating an initial amount of water vapor in an anode of a fuel cell upon startup;
   calculating an amount of $H_2O$ diffused from a cathode to the anode during power generation by the fuel cell;
   calculating an amount of water vapor discharged upon gas purging in the anode during the power generation by the fuel cell;
   calculating an amount of water vapor recirculated to the anode during the power generation by the fuel cell,
   wherein an actual amount of water vapor in the anode is calculated based on the calculated amount of the diffused $H_2O$, the calculated amount of the discharged water vapor, and the calculated amount of the recirculated water vapor, and
   wherein an amount of condensed water in a water trap is calculated based on a difference between the calculated actual amount of water vapor in the anode and an amount of saturated water vapor in the anode at a current temperature; and
   controlling a drain valve of the fuel system to open or close based on the calculated amount of condensed water in the water trap.

2. The method according to claim 1, wherein:
   in calculating the initial amount of water vapor in the anode upon startup,
   the initial amount of water vapor in the anode is calculated based on an ideal gas equation using a saturated water vapor pressure of the anode at a stack temperature as a current water vapor pressure of the anode.

3. The method according to claim 1, wherein:
   in calculating the amount of $H_2O$ diffused from the cathode to the anode,
   a water vapor diffusion rate due to a water vapor pressure difference between the cathode and the anode is integrated over time to thereby calculate an amount of diffused water vapor between the cathode and the anode, and the calculated amount of diffused water vapor is determined to be the amount of $H_2O$ diffused from the cathode to the anode.

4. The method according to claim 3, wherein:
in calculating the amount of $H_2O$ diffused from the cathode to the anode,
a correction factor (K, $0 \leq K \leq 1$) for compensating for an amount of $H_2O$ discharged to an outside of a fuel cell stack among $H_2O$ generated at the cathode is determined, and
a corrected amount of diffused water vapor, obtained by multiplying the calculated amount of diffused water vapor by the correction factor, is determined to be the amount of $H_2O$ diffused from the cathode to the anode.

5. The method according to claim 4, wherein the correction factor is a value selected using a predetermined map based on a degree of opening of an air pressure control valve connected to an air outlet and a rotation speed of an air compressor.

6. The method according to claim 1, wherein:
in calculating the amount of water vapor discharged upon purging,
the amount of water vapor discharged upon purging is calculated by multiplying a total gas purge rate by a molar fraction of water vapor to obtain a water vapor purge rate and by integrating the water vapor purge rate over time.

7. The method according to claim 1, wherein:
in calculating the amount of water vapor recirculated to the anode,
the amount of water vapor recirculated to the anode is calculated by multiplying a total amount of recirculated gas, determined depending on a hydrogen supply pressure and a stack current, by a partial pressure of water vapor in a gas in the anode.

8. The method according to claim 1, wherein a water trap water level (%) is additionally calculated based on a volume ratio of the calculated amount of condensed water in the water trap and an internal volume of the water trap.

9. A method of controlling a drain valve of a fuel cell system, the method comprising:
calculating an initial amount of water vapor in an anode of a fuel cell upon startup;
calculating an amount of $H_2O$ diffused from a cathode to the anode during power generation by the fuel cell;
calculating an amount of water vapor discharged upon gas purging in the anode during the power generation by the fuel cell;
calculating an amount of water vapor recirculated to the anode during the power generation by the fuel cell;
calculating an amount of condensed water in a water trap based on a difference between an actual amount of water vapor in the anode calculated and an amount of saturated water vapor in the anode at a current temperature, wherein the actual amount of water vapor in the anode is calculated based on the calculated amount of the diffused $H_2O$, the calculated amount of the discharged water vapor, and the calculated amount of the recirculated water vapor;
determining a water trap water level (%) based on a volume ratio of the calculated amount of condensed water in the water trap and an internal volume of the water trap;
opening the drain valve to discharge condensed water when a water level determined in the water trap exceeds a reference water level value; and
closing the drain valve when an accumulated purge amount exceeds a reference purge amount.

10. The method according to claim 9, wherein:
the initial amount of water vapor in the anode is calculated based on an ideal gas equation using a saturated water vapor pressure of the anode at a stack temperature as a current water vapor pressure of the anode.

11. The method according to claim 9, wherein:
in calculating the amount of $H_2O$ diffused from the cathode to the anode,
a water vapor diffusion rate due to a water vapor pressure difference between the cathode and the anode is integrated over time to thereby calculate an amount of diffused water vapor between the cathode and the anode, and the calculated amount of diffused water vapor is determined to be the amount of $H_2O$ diffused from the cathode to the anode.

12. The method according to claim 11, wherein:
calculating the amount of $H_2O$ diffused from the cathode to the anode includes:
determining a correction factor (K, $0 \leq K \leq 1$) for compensating for an amount of $H_2O$ discharged to an outside of a fuel stack among $H_2O$ generated at the cathode, and
determining a corrected amount of diffused water vapor as the amount of $H_2O$ diffused from the cathode to the anode, wherein the corrected amount of diffused water vapor is obtained by multiplying the calculated amount of diffused water vapor by the correction factor.

13. The method according to claim 12, wherein the correction factor is a value selected using a predetermined map depending on a degree of opening of an air pressure control valve connected to an air outlet and a rotation speed of an air compressor.

14. The method according to claim 9, wherein:
in calculating the amount of water vapor discharged upon purging,
the amount of water vapor discharged upon purging is calculated by multiplying a total gas purge rate by a molar fraction of water vapor to obtain a water vapor purge rate and by integrating the water vapor purge rate over time.

15. The method according to claim 9, wherein:
in calculating the amount of water vapor recirculated to the anode,
the amount of water vapor recirculated to the anode is calculated by multiplying a total amount of recirculated gas, determined based on a hydrogen supply pressure and a stack current, by a partial pressure of water vapor in a gas in the anode.

16. An apparatus for estimating an amount of condensed water in a fuel cell system, comprising:
an initial anode water vapor amount calculation unit configured to calculate an initial amount of water vapor in an anode of a fuel cell upon startup;
an anode diffusion amount calculation unit configured to calculate an amount of $H_2O$ diffused from a cathode to the anode during power generation by the fuel cell;
a purge amount calculation unit configured to calculate an amount of water vapor discharged upon gas purging in the anode during the power generation by the fuel cell;
a recirculation amount calculation unit configured to calculate an amount of water vapor recirculated to the anode during the power generation by the fuel cell; and a condensed water amount determination and water level estimation unit configured to calculate an actual amount of water vapor in the anode based on values calculated using the initial anode water vapor amount calculation unit, the anode diffusion amount calculation unit, the purge amount calculation unit, and the recirculation amount calculation unit and configured to calculate an amount of condensed water in a water trap based on a difference between the calculated actual amount of water vapor in the anode and an amount of saturated water vapor in the anode at a current temperature.

17. The apparatus according to claim 16, wherein:
the initial anode water vapor amount calculation unit is configured to calculate the initial amount of water vapor in the anode based on an ideal gas equation using a saturated water vapor pressure of the anode at a stack temperature as a current water vapor pressure of the anode,
the anode diffusion amount calculation unit is configured to calculate an amount of diffused water vapor between the cathode and the anode by integrating a vapor diffusion rate over time,
the purge amount calculation unit is configured to calculate the amount of water vapor discharged upon purging by multiplying a total gas purge rate by a molar fraction of water vapor to obtain a water vapor purge rate and integrating the water vapor purge rate over time, and
the recirculation amount calculation unit is configured to calculate the amount of water vapor recirculated to the anode by multiplying a total amount of recirculated gas, which is determined depending on a hydrogen supply pressure and a stack current, by a partial pressure of water vapor in a gas in the anode.

18. The apparatus according to claim 17, wherein:
the anode diffusion amount calculation unit is configured to:
   determine a correction factor ($K$, $0 \leq K \leq 1$) for compensating for an amount of $H_2O$ discharged to an outside of a fuel stack among $H_2O$ generated at the cathode, and
   determine a corrected amount of diffused water vapor as the amount of $H_2O$ diffused from the cathode to the anode, wherein the corrected amount of diffused water vapor is obtained by multiplying the calculated amount of diffused water vapor by the correction factor, and
wherein the correction factor is a value selected using a predetermined map based on a degree of opening of an air pressure control valve connected to an air outlet and a rotation speed of an air compressor.

19. The apparatus according to claim 16, wherein the condensed water amount determination and water level estimation unit is configured to calculate a water trap water level (%) based on a volume ratio of the calculated amount of condensed water in the water trap and an internal volume of the water trap.

20. The apparatus according to claim 19, wherein:
when a water level determined in the water trap using the condensed water amount determination and water level estimation unit exceeds a reference water level value, a drain valve opening command is transmitted to a controller, and
when an accumulated purge amount exceeds a reference purge amount, a drain valve closing command is transmitted to the controller.

* * * * *